(12) United States Patent
Yu

(10) Patent No.: US 8,523,422 B2
(45) Date of Patent: Sep. 3, 2013

(54) LED BACK LIGHT MODULE AND LIQUID CRYSTAL DISPLAY DEVICE

(75) Inventor: Eric Yu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 56 days.

(21) Appl. No.: 13/375,531

(22) PCT Filed: Oct. 18, 2011

(86) PCT No.: PCT/CN2011/080889
§ 371 (c)(1),
(2), (4) Date: Dec. 1, 2011

(87) PCT Pub. No.: WO2013/053139
PCT Pub. Date: Apr. 18, 2013

(65) Prior Publication Data
US 2013/0094241 A1      Apr. 18, 2013

(30) Foreign Application Priority Data

Oct. 12, 2011  (CN) .......................... 2011 1 0308553

(51) Int. Cl.
*F21V 7/04*        (2006.01)
(52) U.S. Cl.
USPC ......................................... 362/633; 362/97.3
(58) Field of Classification Search
USPC .............. 362/602, 634, 633, 97.3, 97.1, 97.2, 362/615, 621, 622, 629, 632; 385/88, 92, 385/901
See application file for complete search history.

(56) References Cited

U.S. PATENT DOCUMENTS

| 2004/0027067 | A1* | 2/2004 | Song et al. ..................... 313/512 |
| 2006/0023468 | A1* | 2/2006 | Takahashi et al. ............ 362/555 |
| 2008/0186737 | A1* | 8/2008 | Awai et al. ..................... 362/617 |
| 2010/0027290 | A1* | 2/2010 | Hamada et al. ............... 362/612 |
| 2010/0128465 | A1 | 5/2010 | Byoun et al. |
| 2010/0165233 | A1* | 7/2010 | Jung ............................... 349/58 |
| 2011/0075444 | A1* | 3/2011 | Hamada et al. ............... 362/612 |
| 2012/0281151 | A1* | 11/2012 | Abe ............................... 348/739 |

FOREIGN PATENT DOCUMENTS

| CN | 1786788 A | 6/2006 |
| CN | 1959496 A | 5/2007 |
| CN | 1982979 A | 6/2007 |
| CN | 101392888 A | 3/2009 |
| CN | 101676769 A | 3/2010 |
| CN | 201487746 U | 5/2010 |

(Continued)

OTHER PUBLICATIONS

English Translation of CN101392888 Pub 2009.*

(Continued)

*Primary Examiner* — Mariceli Santiago
*Assistant Examiner* — Glenn Zimmerman
(74) *Attorney, Agent, or Firm* — IPro, Inc.; Na Xu

(57) ABSTRACT

The present invention discloses a LED back light module and a LCD device, wherein the LED back light module comprises a lamp source fixing device for fixing the LED light bar, and a light guide plate which is arranged oppositely to the LED light bar; wherein said lamp source fixing device is fixedly connected with said light guide plate. The present invention can guarantee high incidence rate under various temperature conditions by keeping the light coupling distance between the LED and the light guide plate unchanged.

16 Claims, 4 Drawing Sheets

(56) References Cited

FOREIGN PATENT DOCUMENTS

| | | | |
|---|---|---|---|
| CN | 101968190 | A | 2/2011 |
| CN | 102003661 | A | 4/2011 |
| CN | 201803229 | U | 4/2011 |
| CN | 102155693 | A | 8/2011 |
| JP | 2007-250197 | A | 9/2007 |
| JP | 2010-250122 | A | 11/2010 |
| WO | WO 2011093121 | A1 * | 8/2011 |

OTHER PUBLICATIONS

Yang Xi, The International Searching Authority written comments, Jul. 2012, CN.

Li Yan, The first office action, Jul. 2012, CN.

Li Yan, The second office action, Mar. 2013, CN.

* cited by examiner

LED BACK LIGHT MODULE AND LIQUID CRYSTAL DISPLAY DEVICE

TECHNICAL FIELD

The present invention relates to the field of displays, particularly to a light emitting diode (LED) back light module and a liquid crystal display (LCD) device.

BACKGROUND

As show FIG. 1, in the LED back light module at present, the LED temperature is very high, and the light guide plate will be expanded and deformed because of the high temperature. Thus, the light coupling distance between the light incident surface of the light guide plate and the light emergent surface of the LED light source is changed, and the LED incident light efficiency is seriously affected. In addition, the disappearance of the light coupling distance even causes the LED(s) to be pressed so that the LED lamp(s) fails or is damaged.

SUMMARY

The aim of the present invention is to provide a LED back light module and a LCD device thereof capable of guaranteeing high incident light efficiency under the condition of different temperatures.

The purpose of the present invention is achieved by the following technical schemes.

A LED back light module comprises a lamp source fixing device for fixing the LED light bar, and a light guide plate which is arranged oppositely to the LED light bar, wherein said lamp source fixing device is fixedly connected with said light guide plate.

Preferably, the surface of said lamp source fixing device which is in contact with the light guide plate is provided with a step notch which is used for butting the light incident surface of the light guide plate. The lamp source fixing device is connected with the light guide plate by the reflective double sided adhesive tape (or other adhesive material), and the port of the surface of the lamp source fixing device which is in contact with the light guide plate is formed with a step notch. The distance between the light guide plate and the LED light emergent surface is controlled by the step notch, the light guide plate is fixed into the step notch of the lamp source fixing device, and the side surface of the light guide plate is in contact with the side wall of the step notch of the lamp source fixing device and cannot be in contact with the LED across the step notch. Therefore, zero light coupling distance between the LED light emergent surface and the light guide plate is achieved, and the pressure applied to the LED light emergent surface by the expansion and deformation of the light guide plate is not a concern.

Preferably, the main body of said lamp source fixing device is fixedly connected with the bottom surface of the light guide plate which is arranged oppositely to the light emergent surface; said lamp source fixing device is provided with an extension part in the position corresponding to the light emergent surface of the light guide plate; and the extension part of said lamp source fixing device is fixedly connected to the light emergent surface of the light guide plate. The two surfaces are reliably fixed. In addition, the extension part of the lamp source fixing device can prevent the light leaking from LED and increase the incident light efficiency of the light guide plate.

Preferably, the surface of the extension part of said lamp source fixing device which is in contact with the light guide plate is provided with a step notch which is used for butting the light incident surface of the light guide plate. The lamp source fixing device is connected with the light guide plate by the reflective double sided adhesive tape (or other adhesive material), and the port of the surface of the lamp source fixing device which is in contact with the light guide plate is formed with a step notch. The distance between the light guide plate and the LED light emergent surface is controlled by the step notch; the light guide plate is fixed into the step notch of the lamp source fixing device; and the side surface of the light guide plate is in contact with the side wall of the step notch of the lamp source fixing device and cannot be in contact with the LED across the step notch. Therefore, zero light coupling distance between the LED light emergent surface and the light guide plate is achieved, and the pressure applied to the LED light emergent surface by the expansion and deformation of the light guide plate is not a concern.

Preferably, said light guide plate is fixedly connected with said lamp source fixing device by the reflective double sided adhesive tape. This is the specific fixing mode of the light guide plate and the lamp source fixing device. The reflective double sided adhesive tape can also reflect light and increase the incident light efficiency when fixing the light guide plate and the lamp source fixing device.

Preferably, said back light module also comprises a backplane, and said lamp source fixing device is movably arranged on said backplane.

Said backplane is provided with a containing groove for arranging said lamp source fixing device; one side of said containing groove opposite to the LED of the lamp source fixing device is provided with buffer material, and said buffer material is in contact with the main body of said lamp source fixing device. Because the lamp source fixing device is not fixedly arranged on the backplane, the lamp source fixing device is butted by buffer material such as rubber, spring and the like which have compression elasticity, to prevent the lamp source fixing device and the light guide plate from shaking in the back light module.

Preferably, said lamp source fixing device is made of aluminum extrusion. The aluminum extrusion has the advantages of moderate price, light weight, good heat dissipation performance and higher cost performance. The lamp source fixing device made of metal material can also perform the heat dissipation function when effectively fixing the LED light bar.

A LCD device comprises the aforementioned LED back light module.

In the prior art, the light guide plate is arranged on the reflection sheet; the reflection sheet is arranged on the fixing device, and the lamp source fixing device is fixed by screws. When the light guide plate is expanded with heat, the light coupling distance between the LED light emergent surface of the lamp source fixing device and the light incident surface of the light guide plate is changed, and then the incident light efficiency of the light guide plate is greatly affected. The disappearance of the light coupling distance even causes the LED to be pressed possibly so that the LED lamp(s) fails or is damaged. In the present invention, the light guide plate is fixedly connected with the lamp source fixing device. Therefore, when the light guide plate is expanded with heat, the lamp source fixing device is moved with the expansion direction of the light guide plate, and the light coupling distance between the LED and the light guide plate is unchanged; when the light guide plate is contracted with cold, the lamp source fixing device is moved with the contraction direction of the light guide plate, and the light coupling distance between the LED and the light guide plate is also unchanged. The present invention can guarantee high incidence rate under various temperature conditions by keeping the light coupling distance between the LED and the light guide plate unchanged.

Wherein: 1. backplane; 11. fin insertion; 12. containing groove 2. lamp source fixing device; 21. fin; 31, PCB; 32, LED; 4. light guide plate; 5. reflection sheet; 51. reflective double sided adhesive tape; 6. buffer material.

DETAILED DESCRIPTION

The present invention will further be described in detail in accordance with the figures and the preferred embodiments.

A LCD device comprises a LED back light module; the LED back light module comprises a lamp source fixing device 2 for fixing the LED32 light bar, a light guide plate 4 which is arranged oppositely to the LED32 light bar, and a backplane 1 for fixing the lamp source fixing device 2; said lamp source fixing device 2 is fixedly connected with said light guide plate 4, and said lamp source fixing device 2 is movably arranged on said backplane 1. Said lamp source fixing device can be made of metal material with preferable heat dissipation performance, such as aluminum extrusion. The aluminum extrusion has the advantages of moderate price, light weight, good heat dissipation performance and higher cost performance. The lamp source fixing device made of metal material can also perform the heat dissipation function when effectively fixing the LED light bar.

The invention will further be described in detail in accordance the specific embodiments.

Embodiment 1

Figure 1:
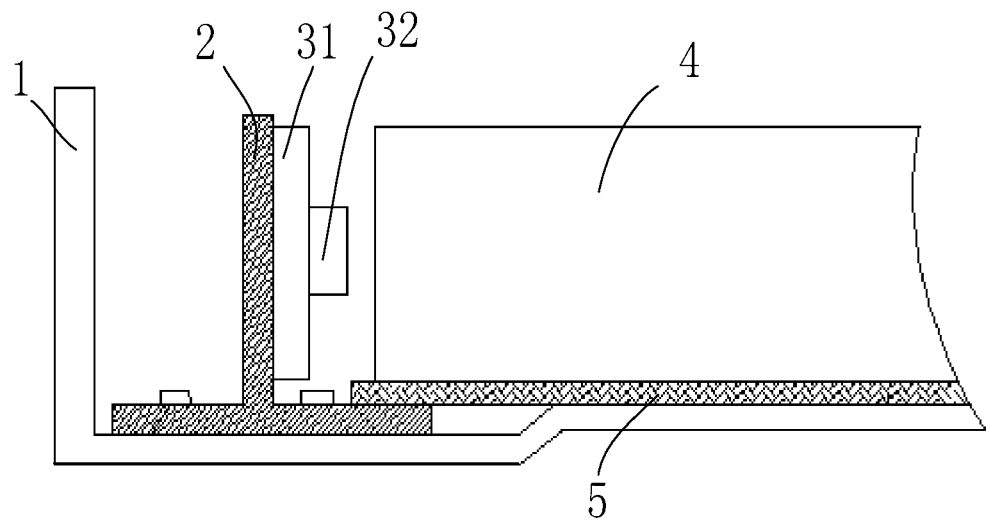
FIG. 1 is a structural diagram of the LED back light module of the prior art.
Figure 2:
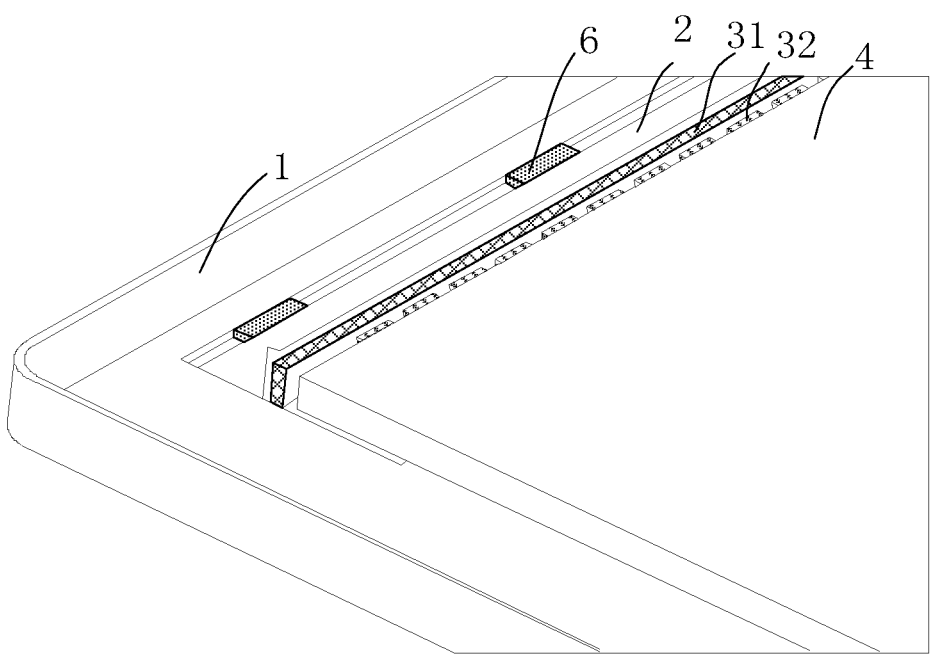
FIG. 2 is a schematic diagram of part of the LED back light module of the present invention.
Figure 3:
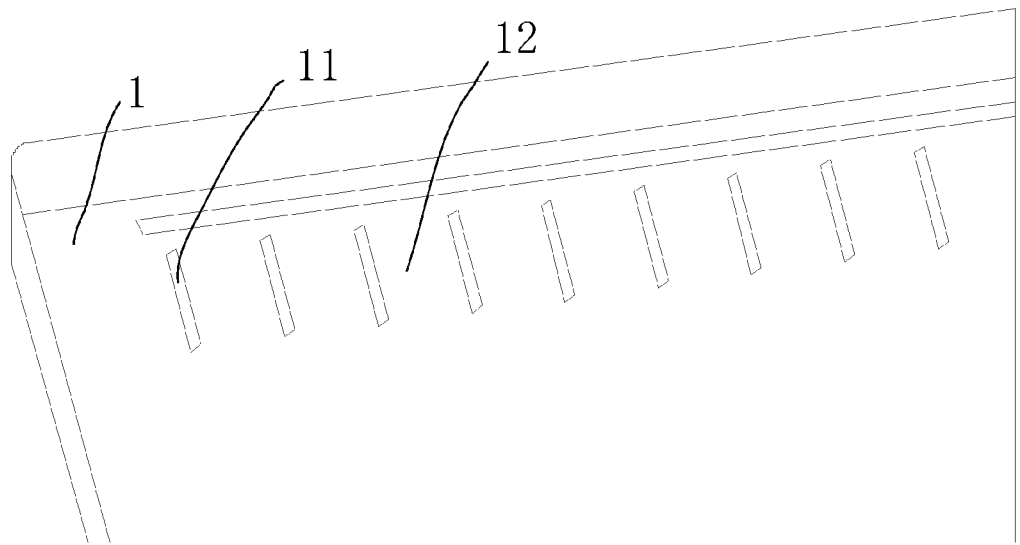
FIG. 3 is a schematic diagram of the fin insertion holes of the present invention.
Figure 4:
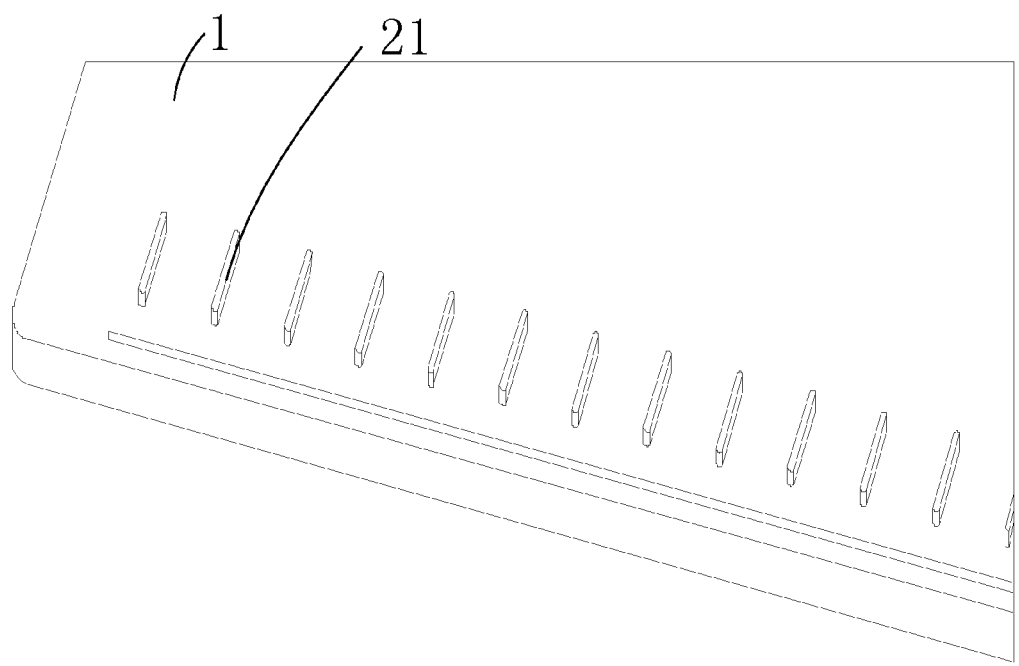
FIG. 4 is a schematic diagram of the fins of the present invention.
Figure 5:
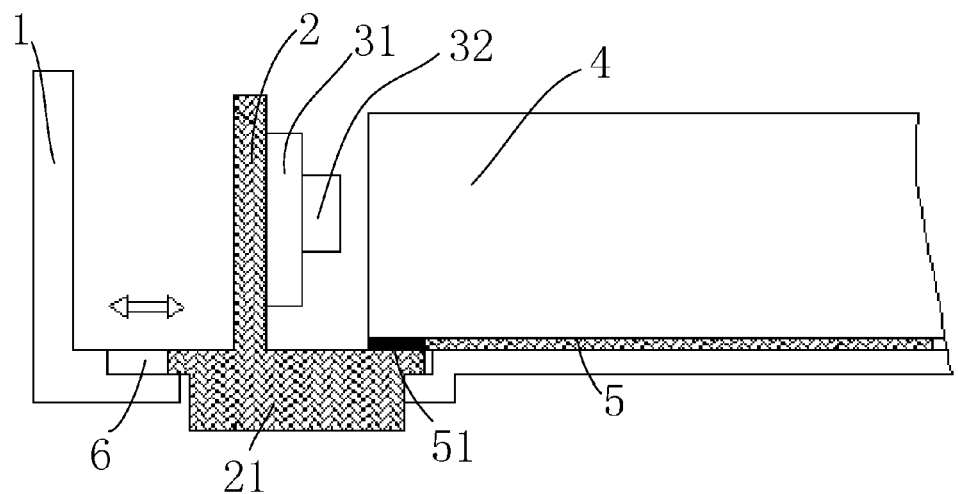
FIG. 5 is a structural diagram of the LED back light module without step notch of a first embodiment of the present invention.
Figure 6:
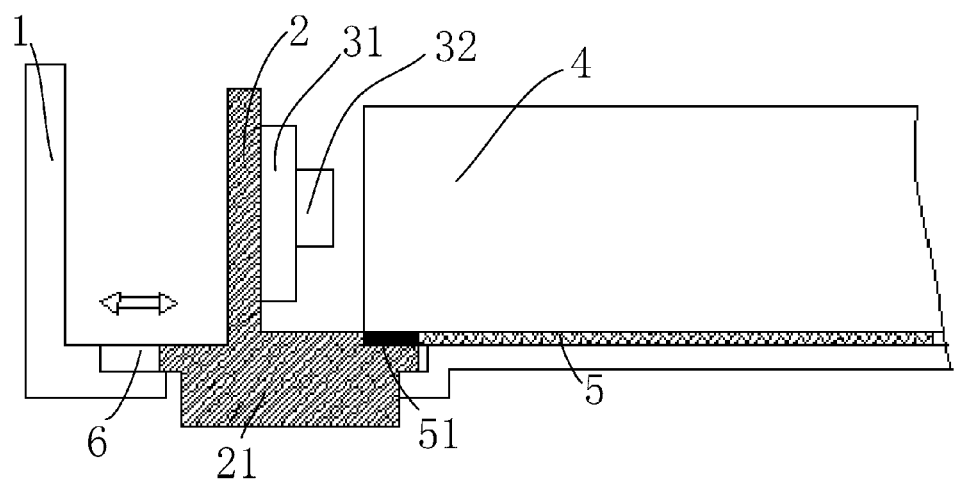
FIG. 6 is a structural diagram of the LED back light module with step notch of a first embodiment of the present invention.

As shown in FIG. 1 to FIG. 6, said LED32 light bar comprises LED32 and PCB31 connected with the LED32, wherein the PCB31 is fixed on the lamp source fixing device 2. The surface of the lamp source fixing device 2 which is in contact with the backplane 1 is the bottom surface; one side of the bottom surface of the lamp source fixing device 2 is provided with a reflection sheet 5; the light guide plate 4 is arranged on the reflection sheet 5, and one side of the light guide plate 4 is arranged oppositely to the LED32. The bottom surface of the light guide plate 4 which is in contact with the reflection sheet 5 is partially overlapped with the main body of the lamp source fixing device 2, and the light guide plate 4 and the lamp source fixing device 2 are bonded together by reflective double sided adhesive tape 51 or other viscous material. Of course, the lamp source fixing device 2 and the light guide plate 4 can be fixed by screws, rivets and the like.

Furthermore, the backplane 1 is provided with a containing groove 12 for arranging said lamp source fixing device 2, and several sections or a whole section of buffer material 6 such as rubber strip, spring and the like which have compression elasticity is arranged between one side opposite to the LED32 light bar attached to the lamp source fixing device and the wall of the containing groove 12. Because the lamp source fixing device 2 is not fixedly arranged on the backplane 1, the lamp source fixing device 2 is butted by the buffer material 2 such as rubber, spring and the like which have compression elasticity, to prevent the lamp source fixing device 2 and the light guide plate 4 from shaking in the back light module.

Furthermore, the surface of said lamp source fixing device 2 which is in contact with the light guide plate 4 is provided with a step notch which is used for butting the light incident surface of the light guide plate 4. The lamp source fixing device 2 is connected with the light guide plate 4 by the reflective double sided adhesive tape 51 (or other adhesive material), and the port of the surface of the lamp source fixing device 2 which is in contact with the light guide plate 4 is formed with a step notch. The distance between the light guide plate 4 and the LED32 light emergent surface is controlled by the step notch; the light guide plate 4 is fixed into the step notch of the lamp source fixing device 2, and the side surface of the light guide plate 4 is in contact with the side wall of the step notch of the lamp source fixing device 2 and cannot be in contact with the LED32 across the step notch. Therefore, zero light coupling distance between the LED32 light emergent surface and the light guide plate 4 is achieved, and the pressure applied to the LED32 light emergent surface by the expansion and deformation of the light guide plate 4 is not a concern.

Embodiment 2

Figure 7:
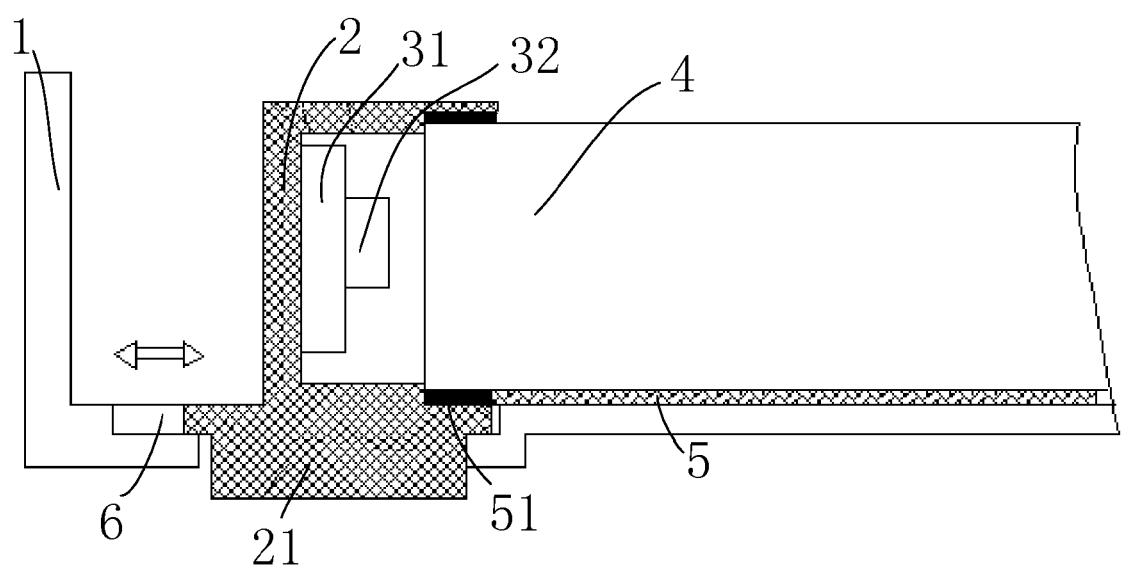
FIG. 7 is a structural diagram of the LED back light module of a second embodiment of the present invention.

As shown in FIG. 1 to FIG. 4 and FIG. 6 to FIG. 7, the main body of said lamp source fixing device 2 is fixedly connected with the bottom surface of the light guide plate 4 which is arranged oppositely to the light emergent surface; said lamp source fixing device 2 is provided with an extension part in the position corresponding to the light emergent surface of the light guide plate 4; the extension part of said lamp source fixing device 2 is fixedly connected to the light emergent surface of the light guide plate 4. The lamp source fixing device 2 can be connected with the light guide plate 4 by the reflective double sided adhesive tape 51 or other adhesive material; of course, the lamp source fixing device 2 and the light guide plate 4 can be fixed by screws, rivets and the like. The two surfaces are reliably fixed, and the extension part of the lamp source fixing device 2 is connected with the light emergent surface of the light guide plate 4. Therefore, a relatively hermetic space is formed between the lamp source fixing device 2 and the light guide plate 4 so that the LED32 light is effectively prevented from leaking, and the phenomenon of light leakage is avoided.

Furthermore, the backplane 1 is provided with a containing groove 12 for arranging said lamp source fixing device 2; several sections or a whole section of buffer material such as rubber strip, spring and the like which have certain compression elasticity is arranged between one side opposite to the LED32 light bar attached to the lamp source fixing device 2 and the wall of the containing groove 12. Because the lamp source fixing device 2 is not fixedly arranged on the backplane 1, the lamp source fixing device 2 is butted by the buffer material 6 such as rubber, spring and the like which have compression elasticity, to prevent the lamp source fixing device 2 and the light guide plate 4 from shaking in the back light module.

Furthermore, the surface of said lamp source fixing device 2 which is in contact with the light guide plate 4 is provided with a step notch which is used for butting the light incident surface of the light guide plate 4. The lamp source fixing device 2 is connected with the light guide plate 4 by the reflective double sided adhesive tape 51 (or other adhesive material), and the port of the surface of the lamp source fixing device 2 which is in contact with the light guide plate 4 is formed with a step notch. The distance between the light guide plate 4 and the LED32 light emergent surface is controlled by the step notch; the light guide plate 4 is fixed into the step notch of the lamp source fixing device 2, and the side surface of the light guide plate 4 is in contact with the side wall of the step notch of the lamp source fixing device 2 and cannot be in contact with the LED32 across the step notch. Therefore, zero light coupling distance between the LED32 light emergent surface and the light guide plate 4 is achieved, and the pressure applied to the LED32 light emergent surface by the expansion and deformation of the light guide plate 4 is not a concern.

Embodiment 3

As shown in FIG. 1 to FIG. 7, the bottom surface of the lamp source fixing device 2 which is in contact with the backplane 1 is provided with fins 21, and each fin 21 can be in sheet shape or can be in other shapes such as cylinder shape and the like. Accordingly, the positions of the containing groove 12 of the backplane 1 corresponding to the fins 21 are provided with fin insertion holes 11, and the fins 21 are exposed outside the LED back light module through the fin insertion holes 11 arranged in the backplane 1.

Furthermore, said fin insertion holes 11 are in clearance fit with said fins 21, and space for moving fins 21 is reserved in said fin insertion holes 11 in the direction facing the light guide plate 4. Thus, the lamp source fixing device 2 is moved with the heat expansion or cold contraction direction of the light guide plate 4 to keep the distance between the LED32 lamp and the light guide plate 4 so as to ensure high incident light efficiency. Refer to the aforementioned embodiment 1 and embodiment 2 for the technical scheme of guaranteeing high incident light efficiency under the condition of different temperatures.

The bottom of the lamp source fixing device 2 is formed with many fins 21. The fins 21 can be in sheet shape or can be in other shapes such as cylinder shape and the like. Of course, the fins 21 can be arranged in the other positions of the lamp source fixing device 2 as well. A containing groove 12 which has certain depth and is used for arranging the lamp source fixing device 2 is formed inside the backplane 1, and holes which correspond to the shape of each fin 21 of the lamp source fixing device 2 are cut in the containing groove 12 to form the fin insertion holes 11. Furthermore, each fin insertion hole 11 is reserved with certain margin to facilitate each fin 21 of the lamp source fixing device 2 to pass through the fin insertion hole 11 of the containing groove 12 of the backplane 1, and is reserved with certain moving space in the direction facing the light guide plate 4. Thus, the heat emitted by the LED32 is directly dissipated to the air through the lamp source fixing device 2, the temperature of the whole back light module is effectively reduced, and the service life of the LED32 is extended.

Meanwhile, the LED32 light bar is bonded or attached to the lamp source fixing device 2. In order to ensure that the incident light efficiency of the LED32 is improved, a fixed and appropriate light coupling distance must be kept between the light emergent surface of the LED32 and the light incident surface of the light guide plate 4. However, the LED32 temperature is higher, and the light guide plate 4 is easy to be expanded with heat and deformed, so that the light coupling distance is different from the initial set value to some extent. The fins of the lamp source fixing device 2 and the holes corresponding to fins in the containing groove 12 are used for guiding. When the light guide plate is expanded with heat, the light guide plate 4 guides the force generated by deformation to the lamp source fixing device 2 and is backwards moved together with the lamp source fixing device 2 in the containing groove 12 so that the light guide plate 4 cannot directly press the LED32 surface. Thus, the fixed light coupling distance between the light guide plate 4 and the LED32 light emergent surface is accurately kept; when the temperature is reduced, the light guide plate 4 is restored to the original shape, the lamp source fixing device 2 is restored to the original position together with the light guide plate 4, and the fixed light coupling distance is still kept. The light coupling distance even can be zero, and the risk that the LED32 is crushed is not a concern.

To sum up, to avoid the light leakage phenomenon, the heat is dissipated to the air through contact convection of the fins 21 of the lamp source fixing device 2 and air. Thus, the temperature of the whole back light module is effectively reduced, and the service life of the LED32 is extended; the stability of the light coupling distance between the light emergent surface of the LED32 light source and the light incident surface of the light guide plate 4 is improved; and the incident light efficiency is increased; the margin space of the lamp source fixing device 2 can absorb the deformation because the light guide plate 4 is expanded with heat to prevent the light guide plate from being deformed; the light guide plate 4 is positioned without cutting, and the machining cost of the light guide plate 4 is saved.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. A light emitting diode (LED) back light module, comprising:
 a lamp source fixing device for fixing a LED light bar, and a light guide plate which is arranged oppositely to the LED light bar; said lamp source fixing device is fixedly connected with said light guide plate;
 wherein said back light module also comprises a backplane, and said lamp source fixing device is movably arranged on said backplane with directly contacting with the backplane;
 wherein said backplane is provided with a containing groove for arranging said lamp source fixing device, one side of said containing groove opposite to the LED of the lamp source fixing device is provided with a buffer material, a top surface of the buffer material is aligned with a top surface of the containing groove, and said buffer material is in contact with the main body of said lamp source fixing device.

2. The LED back light module of claim 1, wherein the surface of said lamp source fixing device which is in contact with the light guide plate is provided with a step notch which is used for butting the light incident surface of the light guide plate.

3. The LED back light module of claim 1, wherein the main body of said lamp source fixing device is fixedly connected with the bottom surface of the light guide plate which is arranged oppositely to the light emergent surface; said lamp source fixing device is provided with an extension part in the position corresponding to the light emergent surface of the light guide plate; the extension part of said lamp source fixing device is fixedly connected to the light emergent surface of the light guide plate.

4. The LED back light module of claim 3, wherein the surface of the extension part of said lamp source fixing device which is in contact with the light guide plate is provided with a step notch which is used for butting the light incident surface of the light guide plate.

5. The LED back light module of claim 1, wherein said light guide plate is fixedly connected with said lamp source fixing device by a reflective double sided adhesive tape.

6. The LED back light module of claim 1, wherein said lamp source fixing device is made of aluminum extrusion.

7. A liquid crystal display (LCD) device comprising:
a lamp source fixing device for fixing a LED light bar, and a light guide plate which is arranged oppositely to the LED light bar; said lamp source fixing device is fixedly connected with said light guide plate;
wherein said back light module also comprises a backplane, and said lamp source fixing device is movably arranged on said backplane with directly contacting with the backplane;
wherein said backplane is provided with a containing groove for arranging said lamp source fixing device, one side of said containing groove opposite to the LED of the lamp source fixing device is provided with a buffer material, a top surface of the buffer material is aligned with a top surface of the containing groove, and said buffer material is in contact with the main body of said lamp source fixing device.

8. The LCD device of claim 7, wherein the surface of said lamp source fixing device which is in contact with the light guide plate is provided with a step notch which is used for butting the light incident surface of the light guide plate.

9. The LCD device of claim 7, wherein the main body of said lamp source fixing device is fixedly connected with the bottom surface of the light guide plate which is arranged oppositely to the light emergent surface; said lamp source fixing device is provided with an extension part in the position corresponding to the light emergent surface of the light guide plate; the extension part of said lamp source fixing device is fixedly connected to the light emergent surface of the light guide plate.

10. The LCD device of claim 9, wherein the surface of the extension part of said lamp source fixing device which is in contact with the light guide plate is provided with a step notch which is used for butting the light incident surface of the light guide plate.

11. The LCD device of claim 7, wherein said light guide plate is fixedly connected with said lamp source fixing device by a reflective double sided adhesive tape.

12. The LCD device of claim 7, wherein said lamp source fixing device is made of aluminum extrusion.

13. The LED back light module of claim 1 further comprising a plurality of fins, wherein the positions of the containing groove of the backplane corresponding to the fins is provided with fin insertion holes, and the fins are exposed outside the LED back light module through the fin insertion holes arranged in the backplane.

14. The LED back light module of claim 13, wherein said the fins and the lamp source fixing device are integrally formed.

15. The LCD device of claim 7 further comprising a plurality of fins, wherein the positions of the containing groove of the backplane corresponding to the fins is provided with fin insertion holes, and the fins are exposed outside the LED back light module through the fin insertion holes arranged in the backplane.

16. The LCD device of claim 15, wherein said the fins and the lamp source fixing device are integrally formed.

* * * * *